*INVENTOR.*
HOWARD J. HANSEN
BY RALPH T. MARETTE

ATTORNEYS

United States Patent Office 3,423,110
Patented Jan. 21, 1969

3,423,110
QUICK-CONNECTIVE COUPLING
Howard J. Hansen, Bay Village, and Ralph T. Marette, Chagrin Falls, Ohio, assignors to The Hansen Manufacturing Company, Cleveland, Ohio, a corporation of Ohio
Filed Feb. 18, 1966, Ser. No. 528,565
U.S. Cl. 285—277                16 Claims
Int. Cl. F16l 27/08, 37/22

ABSTRACT OF THE DISCLOSURE

A quick-connective coupling in which detent members in the socket part have a line contact with a shoulder on the plug part to prevent separation of the socket and plug and a line contact with a side wall of the opening in the socket member in which the detents are positioned and a line contact with a locking sleeve for holding the detent members in locking position. Detent members which are circular in cross-section throughout their length and having concavely shaped center portions of reduced cross-section, convexly curved end portions for engaging the locking sleeve and intermediate portions for engaging a side wall of the opening in the socket part for receiving the detent member.

---

The present invention relates to quick-connective couplings, and more particularly to a quick-connective coupling for use in high pressure applications.

An aspect of the present invention is the provision of a new and improved quick-connective coupling for use with high fluid pressures so constructed and having a construction arranged that its parts for preventing separation of the coupling can be readily and easily operated to disconnect the coupling even when the coupling has been subjected to high pressures for an extended period of time.

Another aspect of the present invention is the provision of a new and improved quick-connective coupling in which a plug member is received in a socket member and a coupling mechanism for connecting or coupling the plug and socket members together includes detents which are designed to have at least line contact with the socket member, plug member and a sleeve member for holding the detents in a coupling position, with the detents being capable of a rolling action on the disconnection of the coupling.

An additional aspect of the present invention is the provision of a new and improved quick-connective coupling in which a plug member is received in a socket member and has an external circumferentially extending axially tapered surface engaged by a plurality of movable detent members disposed in individual openings in the socket member to couple the plug member and socket member and which are held in a coupling position by a locking sleeve, the detent members having portions which engage the sleeve, plug and socket member along lines of engagement which extend in a generally circumferential direction about the coupling to provide a coupling adapted to withstand high differential fluid pressures.

A further aspect of the present invention is the provision of a new and improved quick-connective coupling wherein a plug member has an axially tapered external surface engaged by a detent member supported in an opening in the socket member of the coupling with the detent member being configured to engage the tapered plug surface in a generally circumferential direction.

A still further aspect of the present invention is to provide a quick-connective coupling having a movable detent member for holding parts of the coupling in connected relationship in which the detent member while not originally having an area contact with the surfaces engaged by the member to prevent separation of the parts of the coupling will readily develop a substantial area contact without any significant permanent deformation when placed under a high rated pressure to enable the coupling to withstand the high pressures without significantly affecting ability to separate the coupling.

Summary

In the present invention detent members which are positioned in the socket for engaging a shoulder on a plug to hold the plug in the socket are configured to have at least a line contact with the shoulder on the plug. Moreover, in the preferred embodiment, the detent members have a line contact with a side of the opening in the socket member in which the detent member is positioned and also preferably with a locking sleeve for holding the detent member in locking position with the external configuration of the detent members being curved so that the detent members will roll to release the plug member when the parts are being separated.

Further aspects and advantages of the present invention will be apparent to those skilled in the art to which it relates from the following detailed description of the preferred embodiment described with reference to the accompanying drawings forming a part of the present specification for all subject matter disclosed therein and wherein.

Figure 1:
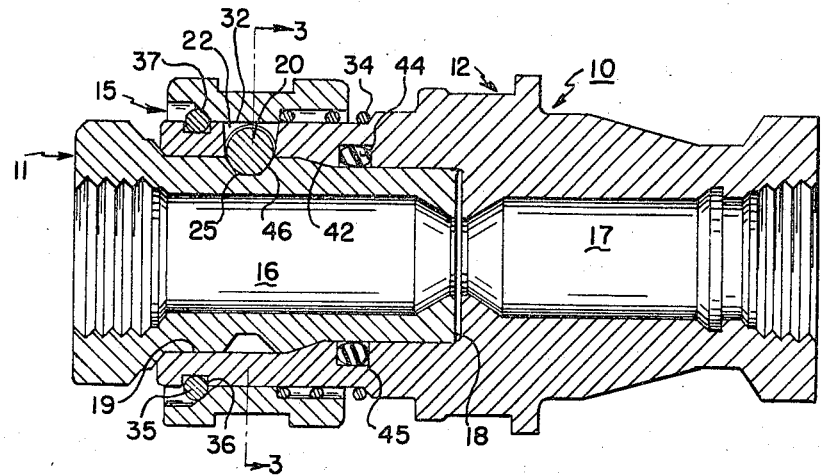
FIG. 1 is a cross-sectional view of a quick-connective coupling embodying the present invention and showing the relative position of the parts when connected.

Referring to the drawings, the present invention is shown as embodied in a quick-connective coupling 10 comprising a male or plug member 11 which is adapted to be inserted in a female or socket member 12 and to be connected or coupled thereto by a coupling mechanism 15 carried by the socket member 12. The plug member 11 and the socket member 12 have axial bores 16 and 17, respectively, therethrough which communicate with each other when the coupling members 11, 12 are connected. The bore 17 is enlarged at the outer end of the socket member, the left end as viewed in FIG. 1, to provide a socket opening 18 for receiving the forward end of the plug member 11. The socket opening 18 has a cylindrical side wall 19.

The plug member 11 is held in the socket member by a plurality of detent members or rollers 20 movably supported in individual elongated openings 22 of the socket member 12. The length of the elongated openings and detent rollers extend chordally of the circumference of the socket member and the openings have longitudinal sides 23a, 23b and end sides 24. The sides 23a, 23b of the openings 22 taper inwardly to provide a bottom opening smaller than the rollers to prevent the latter from falling into the socket opening.

The detent rollers 20, however, each have an inner locking position in which the rollers project inwardly of the side wall 19 of the socket opening to extend chordally thereof and to be received in an external circumferentially extending annular groove 25 in the plug member 11 to hold the plug member 11 in the socket member 12. In their inner locking position in its opening 22 a central portion of each roller 20a engages a side of the groove 25. The roller is movable outwardly of its opening 22 to clear the groove 25 and allow the plug member 11 to be disconnected from and inserted into the socket member 12.

Normally each of the detent rollers 20 is retained in its position where a part thereof projects inwardly of the side wall 19 of the socket opening 18 by a spring biased locking sleeve 30 which encircles the socket member 12 at its forward end. The sleeve 30 has an intermediate cylindrical section 32 which is of substantially the same internal diameter as the outside diameter of the part of the socket member 12 which supports the sleeve 30 and which normally encircles the openings 22 to engage and hold the detent members in their locking position.

The locking sleeve 30 is slidably supported by the socket member 12 for axial movement relative thereto and is biased or urged forwardly toward its normal position in which the intermediate portion 32 encircles and engages the detent rollers 20 by a compression spring 34. A conventional snap ring 35 disposed in an external groove 36 adjacent the left end of the socket member 12 limits the forward movement of the sleeve. The snap ring 35 engages a tapered bottom wall 37 of a recess or counterbore 38 in the left end of the locking sleeve 30 to limit the movement of locking sleeve 30 by the spring to its normal locking position. The sleeve 30 may be moved rearwardly against the bias of the spring 34 to a retracted position, as shown in FIG. 2, where the counterbore 38 of the locking sleeve is positioned immediately outwardly of the detent members 20 to allow the detent members to be moved outwardly of the springs 22 in the socket member 12 so that the roller detents will clear the peripheral groove 25 and allow the plug member 11 and the socket member 12 to be connected and disconnected.

Figures 2, 5:
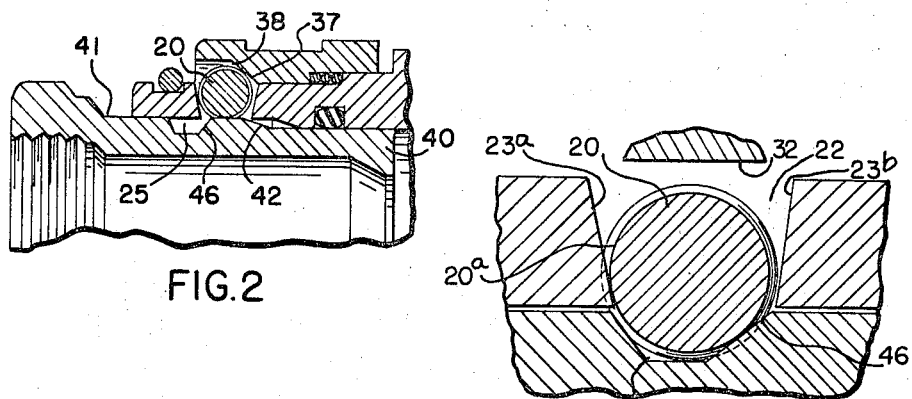
FIG. 2 is a fragmentary cross-sectional view of the quick-connective coupling shown in FIG. 1 illustrating the parts in a different position.
FIG. 5 is a sectional view taken approximately along line 5—5 of FIG. 3.
Figures 3, 4:
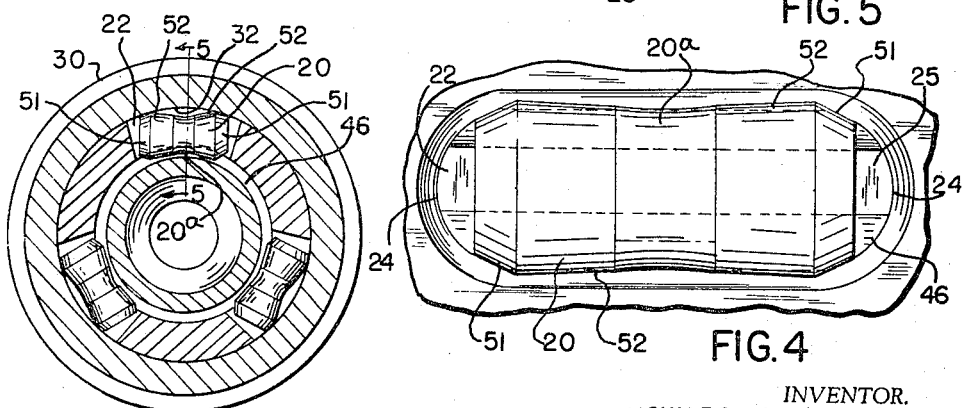
FIG. 3 is a fragmentary cross-sectional view taken along the lines 3—3 of FIG. 1.
FIG. 4 is a fragmentary plan view of the socket and detent member of the quick-connective coupling shown in FIG. 1.

When the plug member 11 and the socket member 12 are to be connected together, the sleeve 30 is moved to its retracted position, as shown in FIG. 2, and the plug member 11 is inserted into the receiving opening 18. As the plug member is inserted into the receiving opening 18, its nose portion 40, which is forward of and reduced in diameter from its rearward portion 41 in which the groove 25 is located, engages any of the detent rollers 20 projecting inwardly of the opening 18 to move them outwardly into the counterbore 38 in the locking sleeve 30. Continued movement of the plug member 11 inwardly of the socket member 12 causes the detent members 20 to ride on the cylindrical portion 40 until they engage a tapered shoulder 42 joining the nose portion 40 and the rearward portion 41 of the plug member whereupon any detent rollers 20 which are riding on the cylindrical portion 40 are moved or cammed outwardly to clear the shoulder 42. When the groove 25 in the plug member is disposed opposite the detent rollers 20, the sleeve 30 is released and the spring 34 returns to its normal position to cause the detent rollers 20 to move into the groove 25 if the rollers have not already fallen thereinto by reason of gravity. The tapered end wall 37 of the recess 38 provides a surface which cams inwardly any detent rollers 20 that have not fallen into the groove 25 when the locking sleeve is released.

A suitable O-ring seal 44 disposed within an annular internal groove 45 of the socket member 12 is provided for establishing a seal between the plug and socket members 11 and 12 when connected together.

When the detent rollers are in locking position, the central part 20a of each roller is received in the groove 25 and acts on the forward or leading side of the groove 25 to prevent separation of the members 11, 12. The leading side of the groove 25 provides an external tapered shoulder 46 which, as is shown in the drawings, is a frusto-conical surface which extends about the axis of the plug member 11 and diverges from the axis outwardly toward the forward end of the plug member 11.

The periphery of the central part 20a of each detent roller 20 is concavely curved in a longitudinal sectional plane of the roller so as to engage the shoulder 46 along a line which extends in a generally circumferential direction along the shoulder. In the illustrated embodiment, the line of engagement is arcuate although a chordal or other generally circumferential line of engagement may be used.

The detent rollers 20 also each have end portions 51 and intermediate portions 52 between the end portions and the central part thereof which are designed to have lines of engagement with the socket member and the locking sleeve respectively which extend lengthwise of the roller axis. In the illustrated embodiment, the intermediate portions 52 are conical portions which increase in diameter toward the outer ends of the roller since the sides 23a, 23b of the slots converge inwardly toward each other. The conical nature of each of the roller portions 52 provides a line of engagement with the side 23a of its respective slot with the line extending generally chordally of the circumference of the socket. The sides 23a are the sides of the slots 22 which react against forces tending to separate the coupling.

The end portions 51 of the detent rollers are convexly curved about the axis of the coupling when the detent rollers are in locking position and engage the locking sleeve 30 along lines extending circumferentially about the socket member.

In operation, pressure in the coupling will tend to drive the plug and socket members apart but separation will be prevented by the detent rollers. The plug will act through the side 46 of the plug groove to urge the roller detents against the longitudinal sides 23a of the slots and outwardly against the locking sleeve 30. The lines of engagement between the detent rollers and the surfaces of other parts which transmit or react against the forces tending to separate the coupling will become areas of engagement due to their deformation under pressure to distribute the forces involved. Because of the extent of the contact between the parts which provides low unit loading at high fluid pressures, the deformation does not become permanent. Thus, in accordance with the present invention, the surfaces of the detent roller and the cooperating surfaces of the locking sleeve, plug member and socket members which are subjected to the forces tending to separate the coupling are shaped in a complemental manner to initially provide at least a line contact between the parts to enable the rapid development of sufficient area contact to distribute the forces between the parts to provide low unit loading. The extent of the line contact between engaging parts is initially determined in accordance with the forces to be transmitted between the parts and the strength of the material involved.

When the coupling is to be released, the locking sleeve 30 is moved rearwardly to allow the detent rollers to move outwardly of the elongated slots 22 into the counterbore in the sleeve. The plug member is then pulled outwardly of the socket member and the tapered shoulder 46 will act to cam the detent rollers outwardly.

It will be noted that the surfaces of each detent roller which engage either the plug or socket member are generated about the axis of the roller and the roller is capable of rolling on the member engaged thereby to facilitate the releasing of the coupling. The provision of a detent roller which has both line contact initially and a rolling action on coupling or uncoupling enables the coupling to be used under high pressures and yet retain the ability to be quickly and easily uncoupled and again coupled.

While a preferred embodiment of the present invention has been described in considerable detail, it will be apparent to those skilled in the art that the detent member may take various forms which will provide at least a line engagement between the plug member and the socket member and the locking sleeve, and while a roller configuration provides for ready rolling or angular movement of the detent member as it is cammed outwardly of its receiving slot upon the release of the plug and socket other configurations may be provided for enabling a rolling or equivalent angular movement of detent member.

While the plug member has been described as having an external circumferential groove for receiving the detent member and providing the shoulder for engaging the detent member to prevent separation, it will be understood that the shoulder on plug member could be provided by an external flange rather than a groove. Also in the illustrated embodiment, the sides of the slot 22 are generated surfaces which are actually frusto-conical. To be exactly complemental to the sides 23, the roller surfaces of intermediate portions 52 of the rollers 20 should ideally be concave in an axial plane. However, because the angle of the sides 23a with respect to a radial plane is small, the rollers 20 will readily establish a line engagement with the sides 23a when placed under load and will, as explained above, readily establish an area contact along the line even though the intermediate portions 52 are conical. If the angle of the sides 23a is such that a line engagement is not readily established with the conical intermediate portions 52 on the rollers 20, the surfaces of the intermediate portions 52 should be made concave in an axial plane so as to be approximately complemental to the sides 23. Moreover, if the longitudinal sides of the slots 22 lie in planes perpendicular to the coupling axis, the portions 61 may have a cylindrical configuration to provide both a line engagement and a rolling action.

It can now be seen that the present invention provides a new and improved quick-connective coupling capable of withstanding high pressures without detrimentally affecting the ability to release the coupling. While a preferred embodiment has been shown and described in detail, it is our intention to cover all modifications constructions and arrangements which fall within the ability of the skilled in the art and the scope and spirit of the appended claims.

What is claimed is:

1. A quick-connective coupling comprising a socket member having a socket opening for receiving a plug member having a forward end portion to be inserted in the socket member and an external shoulder on the forward end portion which tapers outwardly toward the forward end of the plug member, a plurality of elongated detent members disposed in individual elongated slots in said socket member and having locking positions adapted to project inwardly of said socket member to engage said shoulder and hold said plug member against movement outwardly of said socket member, a locking sleeve slidable on said socket member and having a position for holding said detent members against movement outwardly of their respective slots to maintain said detent members in a locking position and a releasing position, the length of said detent members extending chordally of said locking sleeve, the central portion of each of said detent members having a reduced thickness and said detent members each having a part projecting inwardly from its respective slot to engage said shoulder, said part of each detent member having a surface complementary in cross-section configuration to said shoulder to engage said shoulder for a substantial circumferential extent along said shoulder and detent members being movable outwardly of said slots from said locking positions to release said plug member.

2. A quick-connective coupling as defined in claim 1 wherein said detent members each have an external surface curved in a plane transverse to the longitudinal axis of the detent member and on which the detent member is adapted to roll when moved to release the plug member.

3. A quick-connective coupling according to claim 2 wherein said shoulder is generally conical in configuration and said part of each detent member engaging said shoulder is concavely curved in a longitudinal sectional plane through the detent member.

4. A coupling as defined in claim 1 wherein each of said detent members has opposite end portions engaging said locking sleeve with each end portion having a configuration providing a line of engagement with said locking sleeve.

5. A detent member as defined in claim 1 wherein the surfaces of said detent member which engage the socket member and plug member to prevent separation of the plug member and socket member are surfaces generated about the longitudinal axis of the detent member whereby the detent member may roll relative to one of said plug and socket members when moved to release the socket member.

6. A quick-connective coupling as defined in claim 5 wherein said shoulder is generally conical in configuration and said part of each detent member engaging said shoulder is concavely curved in a longitudinal sectional plane through the detent member.

7. A coupling as defined in claim 5 wherein each of said detent members has convexly curved ends which engage said sleeve along circumferentially extending lines.

8. A quick-connective coupling comprising a socket member having a socket opening for receiving a plug member having a forward end portion to be inserted in the socket member and an external shoulder on the plug member which tapers outwardly toward the forward end of the plug member and which is receivable in said opening, a plurality of elongated detent members disposed in individual elongated slots in said socket member and adapted to project inwardly of said socket member to engage said shoulder and hold said plug member against movement outwardly of said socket member, a locking sleeve slidable on said socket member for holding said detent members against movement outwardly of their respective slot to maintain said detent members in a locking position and movable to a releasing position, the length of said detent members extending chordally of said locking sleeve, the central portion of each of said detent members having a reduced thickness and said detent members each having a part projecting inwardly from the respective slot to engage said shoulder, said part of each detent member engaging said shoulder for a substantial extent lengthwise of said detent member to provide a circumferentially extending line of engagement, each of said detent members further engaging a side of said slot for a substantial extent along the length of the detent member to transmit the thrust of a force tending to separate said plug and socket members to said socket member.

9. A coupling as defined in claim 8 wherein the surfaces of each of said detent members which engage the socket member and plug member to hold the plug member and socket member against separation are surfaces generated about the longitudinal axis of the detent member whereby the detent member may roll relative to one of said plug and socket members when moved to release the socket member.

10. A quick-connective coupling according to claim 9 wherein said part of each of said detent members is concavely curved in a longitudinal sectional plane through the detent member.

11. A coupling as defined in claim 9 wherein each of said detent members has a line of engagement with said locking sleeve.

12. A coupling as defined in claim 9 wherein each of said detent members has convexly curved ends which engage said sleeve along circumferentially extending lines.

13. A coupling comprising a plug member and a socket member having an opening in the forward end of the socket member for receiving said plug member, said plug member having a forward end which is to be inserted in the socket member and an external shoulder which tapers conically outwardly toward the forward end of the plug and which is received in said opening, a plurality of rollers disposed in individual openings in said socket member and having an inner position in said openings in which a central portion thereof extends from a socket member to engage said shoulder, said individual openings each having a side engaged by said roller when preventing separation of said plug and socket members, the central portion of each of said rollers being concavely curved in a longitudinal sectional plane of the roller to engage said shoulder along a line extending lengthwise of the roller axis, each of said rollers having end portions and intermediate portions between said end portions and said central portion, said intermediate portions having an external surface generated about the axis of the rollers to have a line engagement with said side and said end portions having a convexly curved surface transverse to the roller axis to engage said sleeve along a circumferentially extending line when said rollers are in their inner position.

14. A coupling as defined in claim 13 wherein the sides of said slots converge and said intermediate portions increase in diameter from said central portion outwardly.

15. A quick-connective coupling comprising a plug member, a socket member having a socket opening for receiving said plug member, said plug member having a forward end to be inserted in the socket member and an internal shoulder on the plug member which faces away from the forward end of the plug member and which is receivable in said opening, a plurality of elongated detent members disposed in individual elongated slots in said socket member having opposed sides which converge radially inwardly, said detent members being adapted to project inwardly of said socket member to engage said shoulder and hold said plug member against movement outwardly of said socket member, a locking sleeve slidable on said socket member for holding said detent members against movement outwardly from their respective slot to maintain said detent members in a locking position and movable to a releasing position, the elongation of said detent members extending chordally of said locking sleeve and said detent members each having a part projecting inwardly from the respective slot to engage said shoulder, said part of each detent member being of a configuration to engage said shoulder for a substantial extent along said detent member to provide a circumferentially extending line of engagement between said detent member and shoulder, each of said detent members further having an external surface of a configuration to engage a side of the slot receiving the member for a substantial extent along the elongation of the detent member to transmit the thrust of a force tending to separate said plug and socket members to said socket member, said external surface engaging said side of said slot being curved in a plane transverse of the elongation of the detent member to provide a surface on which the detent member is adapted to roll to release the plug member, and said detent members each having convexly curved ends which engage said locking sleeve along a line of engagement extending circumferentially of said locking sleeve.

16. A quick-connective coupling according to claim 15 wherein said part of each of said detent members is concavely curved in a longitudinal sectional plane through the detent member.

References Cited

UNITED STATES PATENTS

| | | | |
|---|---|---|---|
| 2,297,548 | 9/1942 | Fox et al. | 285—277 |
| 2,458,088 | 1/1949 | Main | 285—316 |
| 2,518,542 | 8/1950 | Hansen | 285—277 |
| 3,252,721 | 5/1966 | Weasler | 285—316 |

FOREIGN PATENTS

| | | |
|---|---|---|
| 582,013 | 9/1958 | Italy. |

CARL W. TOMLIN, *Primary Examiner.*

THOMAS F. CALLAGHAN, *Assistant Examiner.*